United States Patent
Vandermeijden et al.

(10) Patent No.: US 10,146,360 B2
(45) Date of Patent: Dec. 4, 2018

(54) HYBRID CAPACITIVE AND RESISTIVE SENSING FOR FORCE AND TOUCH

(71) Applicant: SYNAPTICS INCORPORATED, San Jose, CA (US)

(72) Inventors: Tom Vandermeijden, Los Gatos, CA (US); Tetsuo Tanemura, Yokohama (JP); Koji Kokubu, Kawasaki (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 141 days.

(21) Appl. No.: 15/143,476

(22) Filed: Apr. 29, 2016

(65) Prior Publication Data
US 2017/0315653 A1 Nov. 2, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01)

(58) Field of Classification Search
CPC ...... G06F 3/0416; G06F 3/0414; G06F 3/044; G06F 3/045
USPC ........................................................ 345/174
See application file for complete search history.

(56) References Cited

U.S. PATENT DOCUMENTS

| | | | |
|---|---|---|---|
| 8,305,358 B2 | 11/2012 | Klinghult et al. | |
| 8,780,074 B2 | 7/2014 | Castillo et al. | |
| 9,116,569 B2 * | 8/2015 | Stacy | G06F 3/016 |
| 2013/0009905 A1 * | 1/2013 | Castillo | G06F 3/044 345/174 |
| 2013/0082970 A1 | 4/2013 | Frey et al. | |
| 2013/0154998 A1 | 6/2013 | Yang et al. | |
| 2013/0215056 A1 | 8/2013 | Johansson et al. | |
| 2015/0091848 A1 * | 4/2015 | Morein | G06F 3/044 345/174 |
| 2015/0091859 A1 * | 4/2015 | Rosenberg | G06F 3/044 345/174 |
| 2015/0116260 A1 | 4/2015 | Hoen et al. | |
| 2015/0122531 A1 | 5/2015 | Monson et al. | |

* cited by examiner

*Primary Examiner* — Nicholas Lee
*Assistant Examiner* — Ngan T Pham Lu
(74) *Attorney, Agent, or Firm* — Patterson + Sheridan, LLP

(57) ABSTRACT

An input device described herein includes at least one hybrid electrode that is used to perform both capacitive sensing to detect an input object (e.g., a finger or stylus) and force sensing to determine the force applied by the input object on the input device. During a first time period, the input device drives a modulated signal on one more capacitive sensor electrodes to perform capacitive sensing. However, during a second time period, the input device drives a DC voltage across one or more of the capacitive sensor electrodes to perform force sensing. In one example, during the first time period, the input device drives the modulated signal on transmitter electrodes and measures resulting signals on receiver electrodes. During the second time period, however, the input device may drive the DC voltage across the transmitter or receiver electrodes to measure a force applied by the input object.

21 Claims, 8 Drawing Sheets

| TRANSMITTER ACTIVE | ELECTRODES SENSED |
|---|---|
| TX1 | A |
| TX2 | A+B |
| TX3 | B+C |
| TX4 | C+D |
| TX5 | D+E |
| TX6 | E+F |
| TX7 | F+G |
| TX8 | G+H |
| TX9 | H+I |
| TX10 | I+J |
| TX11 | J+K |
| TX12 | K+L |
| TX13 | L+M |
| TX14 | M |

| ELECTRODE | TX. DECODER |
|---|---|
| A | = MS_A |
| B | = MS_AB-MS_A |
| C | = MS_BC-MS_B |
| D | = MS_CD-MS_C |
| E | = MS_DE-MS_D |
| F | = MS_EF-MS_E |
| G | = MS_FG-MS_F |
| H | = MS_GH-MS_G |
| I | = MS_HI-MS_H |
| J | = MS_IJ-MS_I |
| K | = MS_JK-MS_J |
| L | = MS_KL-MS_K |
| M | = MS_LM-MS_L |
|   |   |

US 10,146,360 B2

HYBRID CAPACITIVE AND RESISTIVE SENSING FOR FORCE AND TOUCH

FIELD OF THE INVENTION

This invention generally relates to electronic devices and detecting force using capacitive sensor electrodes.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a plurality of sensor electrodes in a sensing region of the input device and a processing system coupled to the plurality of sensor electrodes. The processing system is configured to, during a first time period, perform capacitive sensing using the plurality of sensor electrodes and a modulated signal and, during a second time period, determine force applied by an input object by driving a DC voltage across a subset of the plurality of sensor electrodes, wherein the subset of sensor electrodes are interconnected to form a force sensor electrode.

Another embodiment described herein is a processing system that includes an interface configured to couple to a plurality of sensor electrodes in a sensing region of an input device and a sensor module. The sensor module is configured to, during a first time period, perform capacitive sensing using the plurality of sensor electrodes and a modulated signal and, during a second time period, determine force applied by an input object by driving a DC voltage across a subset of the plurality of sensor electrodes, where the subset of sensor electrodes are interconnected to form a force sensor electrode.

Another embodiment described herein is an input device that includes a plurality of sensor electrodes in a sensing region of the input device and a processing system coupled to the plurality of sensor electrodes. The processing system configured to, during a first time period, drive a modulated signal on a first electrode of the plurality of sensor electrodes to perform capacitive sensing and, during a second time period, drive a DC voltage across the first electrode and measure a resistance corresponding to the first electrode to determine a force applied by an input object on the input device.

Another embodiment described herein is a processing system that includes an interface configured to couple to a plurality of sensor electrodes in a sensing region of an input device. The processing system also includes a sensor module configured to, during a first time period, drive a modulated signal on a first electrode of the plurality of sensor electrodes to perform capacitive sensing and, during a second time period, drive a DC voltage across the first electrode and measure a resistance corresponding to the first electrode to determine a force applied by an input object on the input device.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
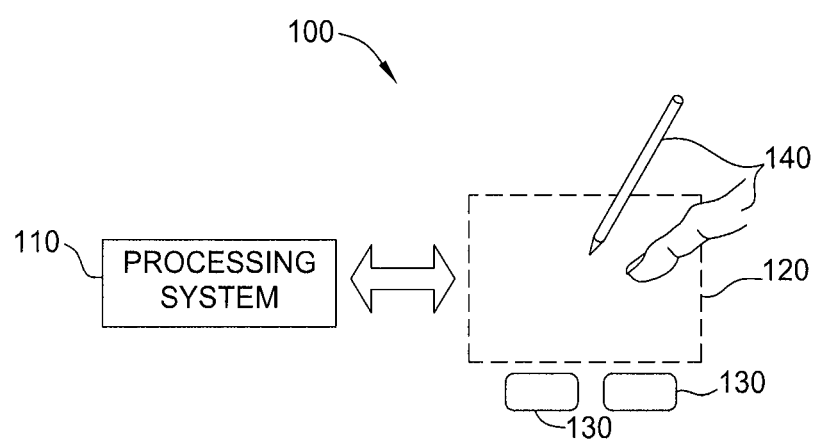
FIG. 1 is a block diagram of an exemplary system that includes an input device in accordance with an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input devices include at least one hybrid electrode that is used to perform both capacitive sensing to detect an input object (e.g., a finger or stylus) and force sensing to determine the force applied by the input object on the input device. During a first time period, the input device drives a modulated signal (e.g., an AC signal) on one more capacitive sensor electrodes to perform capacitive sensing. However, during a second time period, the input device drives a DC voltage across one or more of the capacitive sensor electrodes to perform force sensing. For example, if the input device includes both transmitter and receiver electrodes, during the first time period when performing capacitive sensing, the input device drives the modulated signal on the transmitter electrodes and measures resulting signals on the receiver electrodes to identify a location of the input object in a sensing region. During the second time period, however, the input device may drive the DC voltage across the transmitter or receiver electrodes to measure a force applied by the input object.

In one embodiment, the capacitive sensor electrodes used in the hybrid electrode are electrically coupled (either permanently or by using switches) such that the individual electrodes are interconnected to form the longer hybrid electrode used for force sensing. For example, the ends of the capacitive sensor electrodes may be coupled together so that the total length of the hybrid electrode is combination of the respective lengths of the individual capacitive sensor electrodes.

When an input object applies a force on the hybrid electrode, this force deforms the material of the hybrid electrode and changes the resistance of the hybrid electrode which can be measured by the input device. Furthermore, the input device correlates changes in resistance to forces applied by the input object. In this manner, the same electrodes used for capacitive sensing can also be used to perform force sensing.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object 140. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object 140 near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In one embodiment, the sensing region 120 detects force applied by a user when contacting the sensing region 120 directly (e.g., using a finger) or indirectly (e.g., using a stylus). In one example, the sensing region 120 measures a change in resistance which can be correlated to a particular force applied by the user. If the sensing region 120 includes capacitive sensor electrodes (e.g., receiver and/or transmitter electrodes), these electrodes can be used to perform both capacitive sensing and force sensing as described in greater detail below.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
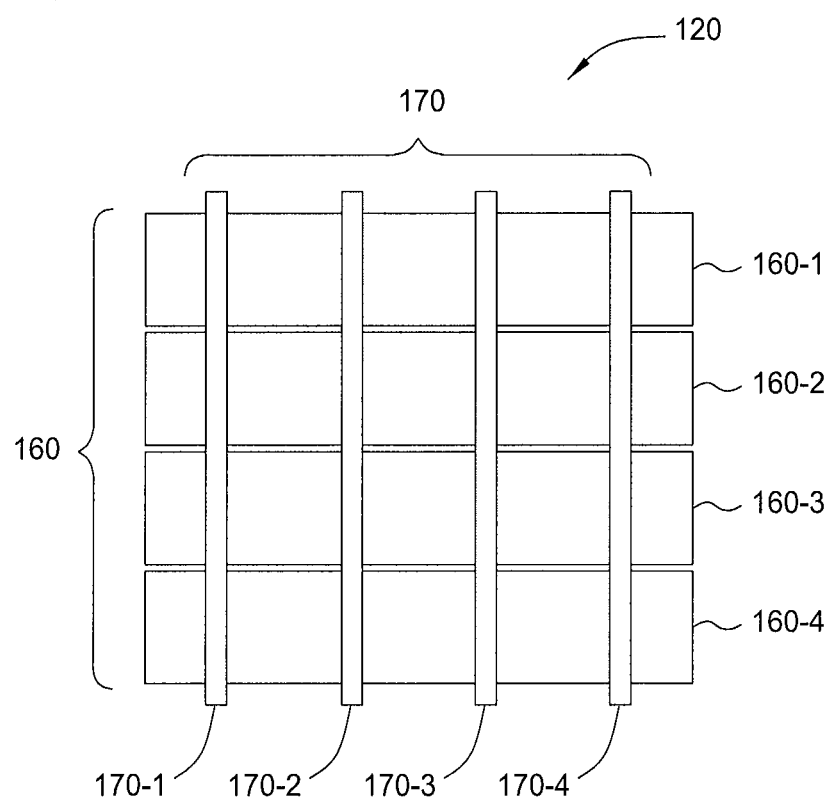
FIGS. 2A and 2B illustrate portions of exemplary patterns of sensing elements or capacitive sensing pixels, according to embodiments described herein.

FIG. 2A shows a portion of an exemplary pattern of sensing elements configured to sense in a sensing region 120 associated with the pattern, according to some embodiments. For clarity of illustration and description, FIG. 2A shows the sensing elements in a pattern of simple rectangles, and does not show various components. This pattern of sensing elements comprises a first plurality of sensor electrodes 160 (160-1, 160-2, 160-3, . . . 160-$n$), and a second plurality of sensor electrodes 170 (170-1, 170-2, 170-3, . . . 170-$n$) disposed over the plurality of sensor electrodes 160. In one embodiment, this pattern of sensing elements comprises a plurality of transmitter electrodes 160 (160-1, 160-2, 160-3, . . . 160-$n$), and a plurality of receiver electrodes 170 (170-1, 170-2, 170-3, . . . 170-$n$) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In such embodiments, the transmitter electrodes and receiver electrodes may be disposed on separate layers of a common substrate. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. The receiver sensor electrodes 170 may be operated singly or multiply to acquire resulting signals. The resulting signals may be used to determine measurements of the capacitive couplings at the capacitive pixels.

As described below, some or all of the transmitter electrodes 160 and receiver electrodes 170 can be used to perform force sensing. That is, during a first period of time, the input device performs capacitive sensing using the electrodes but during a second period of time, performs force sensing using the electrodes. The sensor electrodes used for both capacitive sensing and force sensing can be referred to herein as hybrid electrodes.

Figure 2B:
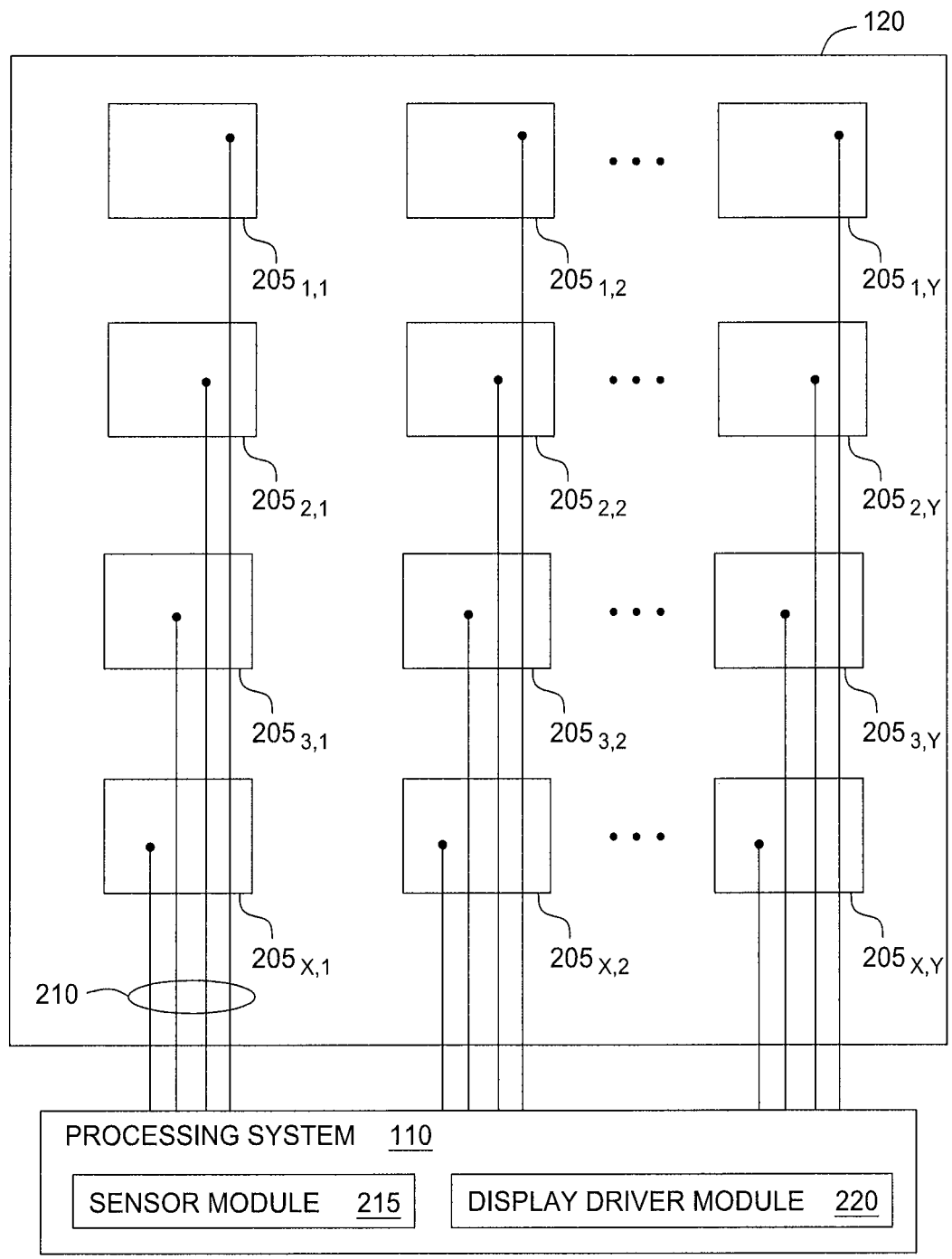

FIG. 2B shows a portion of an exemplary pattern of capacitive sensing pixels 205 (also referred to herein as capacitive pixels or sensing pixels) configured to sense in the sensing region 120 associated with a pattern, according to some embodiments. Each capacitive sensing pixel 205 may include one of more of the sensing elements described above. For clarity of illustration and description, FIG. 2B presents the regions of the capacitive sensing pixels 205 in a pattern of simple rectangles and does not show various other components within the capacitive sensing pixels 205. In one embodiment, the capacitive sensing pixels 205 are areas of localized capacitance (capacitive coupling). Capacitive sensing pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive sensing pixels 205, and thus may be used as an indicator of the presence of the input object in the sensing region 120 of the input device.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. The processing system 110 includes an interface (not labeled) which couples the processing system 110 traces 210 which are in turn coupled to sensor electrodes in the pixels 205. A sensor module 215 in processing system 110 drives a sensor electrode using a trace 210 in each pixel 205 with a modulated signal (i.e., a capacitive sensing signal) and measures a capacitance between the sensor electrode and the input object (e.g., free space or earth ground) based on the modulated signal, which is utilized by the processing system 110 or other processor to determine the position of the input object.

The various electrodes of capacitive sensing pixels 205 are typically ohmically isolated from the electrodes of other capacitive sensing pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive sensing pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

In a third mode of operation, the sensor electrodes in the capacitive sensing pixels 205 and/or traces 210 coupling the capacitive sensing pixels 205 are utilized to detect the force used by an input object to contact the sensing region 120. In one embodiment, the sensor module 215 drives a DC voltage across at least one of the sensor electrodes or the traces 210 and measures a change in resistance of the sensor electrodes or the traces 210 relative to a baseline resistance when no force is applied. This change in resistance is correlated to a force or pressure applied by an input object on the input device resulting in a deformation or deflection of the input surface and the sensor electrodes (e.g., sensor electrodes 160 and 170) and/or sensor traces (e.g., sensor traces 210). Put differently, the same traces or electrodes that are used to perform capacitive sensing can also be used to perform force sensing. Different techniques for performing force sensing are described below along with the later figures.

The input device 100 may be configured to operate in any one of the modes described above. The input device 100 may also be configured to switch between any two or more of the modes described above.

In some embodiments, the capacitive sensing pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive sensing pixels 205.

A set of measurements from the capacitive sensing pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The processing system 110 is coupled to the sensor electrodes via the traces 210 includes a sensor module 215 and optionally, a display driver module 220. In one embodiment the sensor module 215 comprises circuitry configured to drive a transmitter signal or a modulated signal onto and receive resulting signals with the resulting signals the sensor electrodes during periods in which input sensing is desired. In one embodiment the sensor module 215 includes a transmitter module including circuitry configured to drive a transmitter signal onto the sensor electrodes during periods in which input sensing is desired. To perform force sensing, the sensor module 215 may include a resistance measuring circuit for measuring the change in resistance of the traces 210 or the sensor electrodes.

In various embodiments the sensor module 215 includes a receiver module that includes circuitry configured to receive a resulting signal with the sensor electrodes comprising effects corresponding to the transmitter signal during periods in which input sensing is desired. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

The display driver module 220 includes circuitry confirmed to provide display image update information to the display of the display device during non-sensing (e.g., display updating) periods. The display driver module 220 may be included with or separate from the sensor module 215. In one embodiment, the processing system 110 comprises a first integrated controller comprising the display driver module 220 and at least a portion of the sensor module 215 (i.e., transmitter module and/or receiver module). In another embodiment, the processing system 110 comprises a first integrated controller comprising the display driver module 220 and a second integrated controller comprising the sensor module 215. In yet another embodiment, the processing system 110 comprises a first integrated controller comprising a display driver module 220 and one of a transmitter module or a receiver module and a second integrated controller comprising the other one of the transmitter module and receiver module. Although not shown, FIG. 2A may also include the sensor module 215 for performing force and capacitive sensing.

Figure 3:
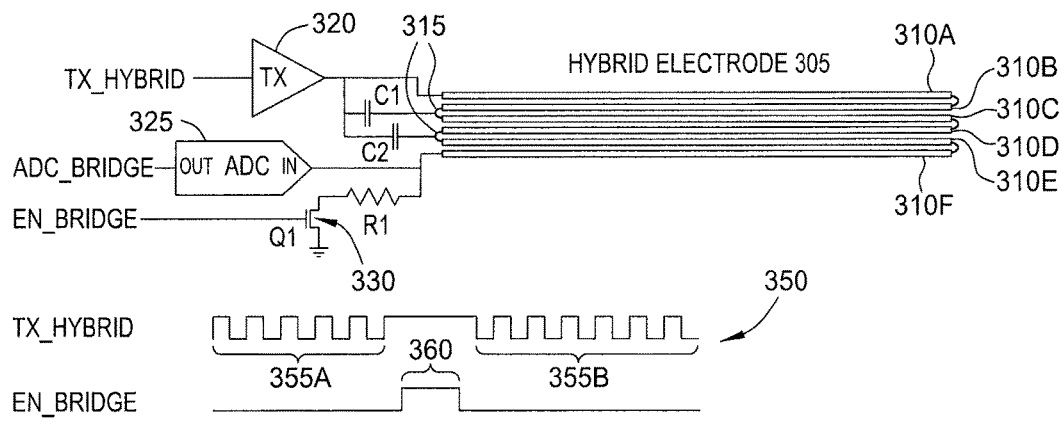
FIG. 3 illustrates coupling together a plurality of capacitive sensor electrodes to form a force sensor electrode, according to embodiments described herein.

FIG. 3 illustrates coupling together a plurality of capacitive sensor electrodes 310 to form a hybrid force sensor electrode 305, according to embodiments described herein. As shown, the hybrid electrode 305 includes a plurality of capacitive sensor electrodes 310. In this example, each of the electrodes 310 is formed on the same surface and form parallel lines. In one embodiment, the sensor electrodes 310 are disposed above a display in the input device, and as such, the material of the individual sensor electrodes 310 in the hybrid electrode 305 is transparent so that light generated from the underlying display can pass through the hybrid electrode 305. One example of transparent conductive material that may be used for the electrodes 310 is indium-tin oxide (ITO). In one embodiment, the electrodes 310 may be disposed below a protective cover of the input device (e.g., a glass substrate) such that the electrodes 310 are between the protective cover and the display in the input device.

The capacitive sensor electrodes 310 are coupled to form an electrical path with a serpentine pattern where the top sensor electrode 310A is electrically coupled to the bottom sensor electrode 310F. Specifically, the hybrid electrode 305 includes connectors 315 which connect one end of each of the capacitive sensor electrodes to an adjacent electrode 310. For example, a first connector 315 couples the right end of electrode 310A to the right end electrode 310B while a second connector 315 couples the left end of electrode 310B to the left end of electrode 305C, and so forth.

Coupling the ends of the capacitive sensor electrodes 310 to each other creates the hybrid electrode 305 which has an effective length of five times the length of the individual electrodes 310. One advantage of arranging the electrodes 310 as shown is that doing so increases the end-to-end resistance of the hybrid electrode 305 relative to an arrangement where the individual capacitive sensor electrodes 310 are merged into a single, thick capacitive electrode—e.g., one of the transmitter electrodes 160 shown in FIG. 2A. Increasing the resistance of the hybrid electrode 305 may increase the accuracy of force sensing as described below.

During capacitive sensing, a transmitter 320 drives a modulated capacitive sensing signal onto each of the capacitive sensor electrodes 310. As shown, the output of the transmitter 320 is directly coupled to the top sensor electrode 310A and is indirectly coupled to the connectors 315 on the left sides of the sensor electrodes 310 via the capacitors C1 and C2. Because the modulated sensing signal is an AC signal, the capacitors C1 and C2 couple the modulated signal directly to the connectors 315 on the left side which means the sensing signal driven on the left sides of sensor electrodes 310B-E is substantially the same as the sensing signal driven on the left side of sensor electrode 310A. As such, the combination of capacitive sensor electrodes 310A-E behave substantially the same as if these five electrodes were replaced with a single, unitary transmitter electrode 160 as shown in FIG. 2A. Although not shown, the modulated capacitive sensing signal transmitted on the sensor electrodes 310 is received on receiver electrodes which are coupled to a sensor module (e.g., sensor module 215 in FIG. 2B) for detecting a location of an input object in the sensing region.

During force sensing, instead of driving a modulated capacitive sensing signal, the transmitter 320 drives a DC voltage at its output and onto sensor electrode 310A. However, because the capacitors C1 and C2 function as DC blocks, the DC voltage is not driven onto the left sides of the sensor electrodes 310B-E. Additionally, the left end of the bottom sensor electrode 310F is coupled to resistor R1 and a switch 330. During force sensing, the EN_BRIDGE signal is high, thereby closing the switch 330 and coupling the resistor R1 to ground. Thus, the DC voltage applied by the transmitter 320 on the left end of electrode 310A and the DC voltage on the side of the resistor R1 coupled to the left end of electrode 310F generate a voltage gradient across the hybrid electrode 305 because of the resistivity of the material of the sensor electrodes 305A-F.

Although ITO is conductive, it still has an inherent resistance which generates a voltage gradient along the lengths of the electrodes 310A-F. This inherent resistance (referred to as $R_{ITO}$) forms a voltage divider with the resistor R1. An analog to digital converter (ADC) 325 is coupled between the left end of the electrode 310F and the resistors R1. When an input object presses on the sensing region, the conductive material of the hybrid electrode 305 flexes (i.e., deforms) thereby changing the resistance $R_{ITO}$. The resistance of the resistor R1, however, remains substantially constant. Thus, as the force applied by the input object changes the resistance $R_{ITO}$ of the hybrid electrode 305, this changes the output of the ADC 325.

In one embodiment, the measurements of the ADC 325 can be compared to a baseline measurement of the resistance $R_{ITO}$ taken when no force is applied to the hybrid electrode 305. In one embodiment, because the input device performs capacitive sensing, and thus, can determine when an input object is present in the sensing region, the baseline resistance measurement can be taken when the sensor module determines an input object is not proximate to the sensing region.

Timing chart 350 illustrates a force sensing time period 360 performed between two capacitive sensing time periods 355. During the first capacitive sensing period 355A, the transmitter 320 outputs the modulated TX_HYBRID signal which is driven on the left ends of the capacitive sensor electrodes 310A-E. As mentioned above, these electrodes 310 behave as a single, unitary transmitter electrode. During the force sensing time period 360, the transmitter 320 outputs a DC voltage and the signal EN_BRIDGE is high which closes the switch 330 and couples the resistor R1 (and the left side of electrode 310F) to ground. Once the signals settle, the ADC 325 captures a digital measurement which can be compared to a baseline force measurement to determine if the resistance $R_{ITO}$ of the hybrid electrode 305 has changed. This change in resistance can be mapped to a corresponding force applied by the input device. At time period 355B, the EN_BRIDGE signal goes low and the transmitter 320 begins again to transmit the modulated signal for capacitive sensing.

In one embodiment, the sensor arrangement in FIG. 3 is repeated to form multiple transmitter electrodes in the input device. For example, the sensing region may include any number of hybrid electrodes 305 which each include six individual capacitive sensor electrodes 310 that are driven by a single transmitter 320. The transmitters 320 can be individually activated to permit the input device to determine location information when performing capacitive sensing. As mentioned above, the transmitters 320 and the transmitter electrodes can be scanned in order to form a capacitive image. In another embodiment, the hybrid electrode 305 may include all the individual sensor electrodes 310 in all the transmitter electrodes in the input device. In contrast to FIG. 3 which illustrates a single transmitter electrode, if the input device includes multiple transmitter electrodes, the topmost and bottommost transmitter electrodes in the input device would be coupled together in a serpentine pattern to all the intermediate electrodes so that the hybrid electrode 305 used when force sensing includes all the individual sensor electrodes 310 in all the transmitter electrodes. For example, assuming there is another transmitter electrode below the transmitter electrode shown in FIG. 3, the left end of electrode 310F would be coupled to the left end of the top capacitive sensor electrode 310 in the adjacent transmitter electrode. The remaining electrodes 310 in the adjacent transmitter electrode would be coupled as shown in FIG. 3. Moreover, the ADC 325, resistor R1, and switch 330 would be coupled to the bottommost capacitive sensor electrode 310 in the bottommost transmitter electrode in the input device. Interconnecting all of the capacitive sensor electrodes 310 in the input device (rather than just the ones coupled to a single transmitter 320) may increase the signal at the output of the ADC 325 and improve the accuracy of the force measurement.

When performing force sensing, the transmitter 320 for the top most transmitter electrode would drive the DC voltage as shown in chart 350 while the other transmitters 320 would be floating. In this manner, the individual resistances of all the electrodes 310 in all the transmitter electrodes can be combined to generate the resistance $R_{ITO}$ of the hybrid electrode 305.

In another embodiment, the capacitors C1 and C2 are replaced by digital or analog switches which close when the input device performs capacitive sensing and open when the device performs force sensing. When closed, the switches allow the transmitter 320 to drive the modulated sensing signal onto the capacitive sensor electrodes 310B-D. However, when opened, the DC voltage outputted by the transmitter 320 is driven directly onto the left end of electrode 310A but not onto the other electrodes 310B-D.

In another embodiment, instead of using a single transmitter 320 to drive the modulated signal onto the six capacitive sensor electrodes 310, the input device may have a respective transmitter for each electrode 310. When performing capacitive sensing, each of the transmitters drives the modulated signal onto the respective hybrid electrode 305. However, during force sensing, only the transmitter coupled to the topmost sensor electrode 310A drives the DC voltage while the other transmitters have floating outputs. In this manner, the serpentine pattern formed from the sensor electrodes 310 can generate a voltage gradient across the hybrid electrode 305.

Figure 4:
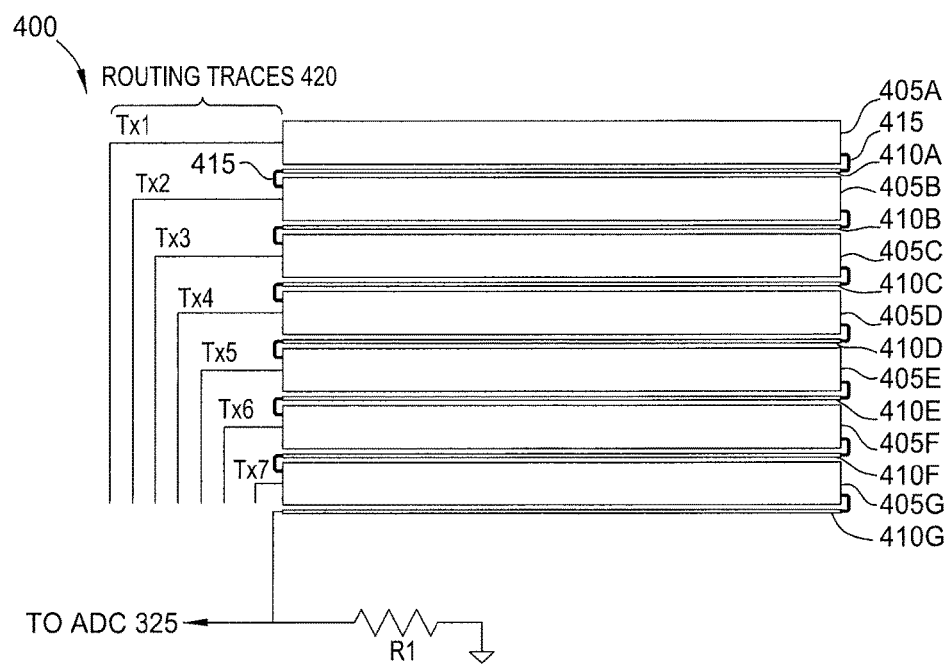
FIG. 4 illustrates coupling together a plurality of capacitive sensor electrodes to form a force sensor electrode, according to embodiments described herein.

FIG. 4 illustrates coupling together a plurality of capacitive sensor electrodes to form a force sensor electrode, according to embodiments described herein. The electrode arrangement 400 includes two different shaped capacitive sensor electrodes—i.e., first sensor electrodes 405A-G and second sensor electrodes 410A-G. Although the electrodes 405 and 410 have the same length, the first sensor electrodes 405 are wider than the second sensor electrodes 410. This difference in area results in the first sensor electrodes 410 having a different resistance than the second sensor electrodes 405. For example, the resistance of second sensor electrode 410A may be an order of magnitude higher than the resistance of first sensor electrode 405A (e.g., 10 k Ohms versus 100 k Ohms).

The first sensor electrodes 405 are coupled to the adjacent second sensor electrodes 410 using connectors 415. That is, the right side of electrode 405A is coupled to the right side of electrode 410A, the left side of electrode 410A is coupled to the left side of electrode 405B, and so forth. Thus, like FIG. 4, the capacitive sensor electrodes 405 and 410 are electrically coupled in a serpentine pattern.

The arrangement 400 includes routing traces 420 electrically coupling the first sensor electrodes 405 to transmitters or receivers (not shown). The routing traces 420 may be coupled to either respective transmitters or receivers or to a multiplexor that selectively couples one of the first sensor electrodes 405 to a transmitter or receiver. Assuming the first sensor electrodes 405 are coupled to transmitters, during capacitive sensing, the transmitters drive a modulated sensing signal on the first sensor electrodes 405. Because the second sensor electrodes 410 are coupled to the first sensor electrodes 405, the modulated signal also propagates on the second sensor electrodes 410. The signal propagating in the second sensor electrodes 410 may result in a slight side effect generating artifacts in the delta image, but the greater resistance of the second sensor electrodes 410 attenuates this effect. The side effect can be further reduced by increasing the resistance ratio between the electrodes 405 and 410.

During force sensing, routing trace TX1 is set to a DC voltage (e.g., VDD) while the other transmitters (i.e., TX2-7) are set to high impedance. The resistance $R_{ITO}$ of the electrodes 405 and 410 form a bridge with R1. As an input object flexes the electrodes 405 and/or 410, the ADC 325 measures changes in the resistance $R_{ITO}$ which can be correlated to force.

One advantage of arrangement 400 is it does not add more routing traces 420 than would otherwise be used to perform capacitive sensor electrodes. By disposing the second sensor electrodes 410 between the first sensor electrodes 405 and using the connectors 415, the arrangement 400 can perform both capacitive sensing and force sensing.

Figure 5:
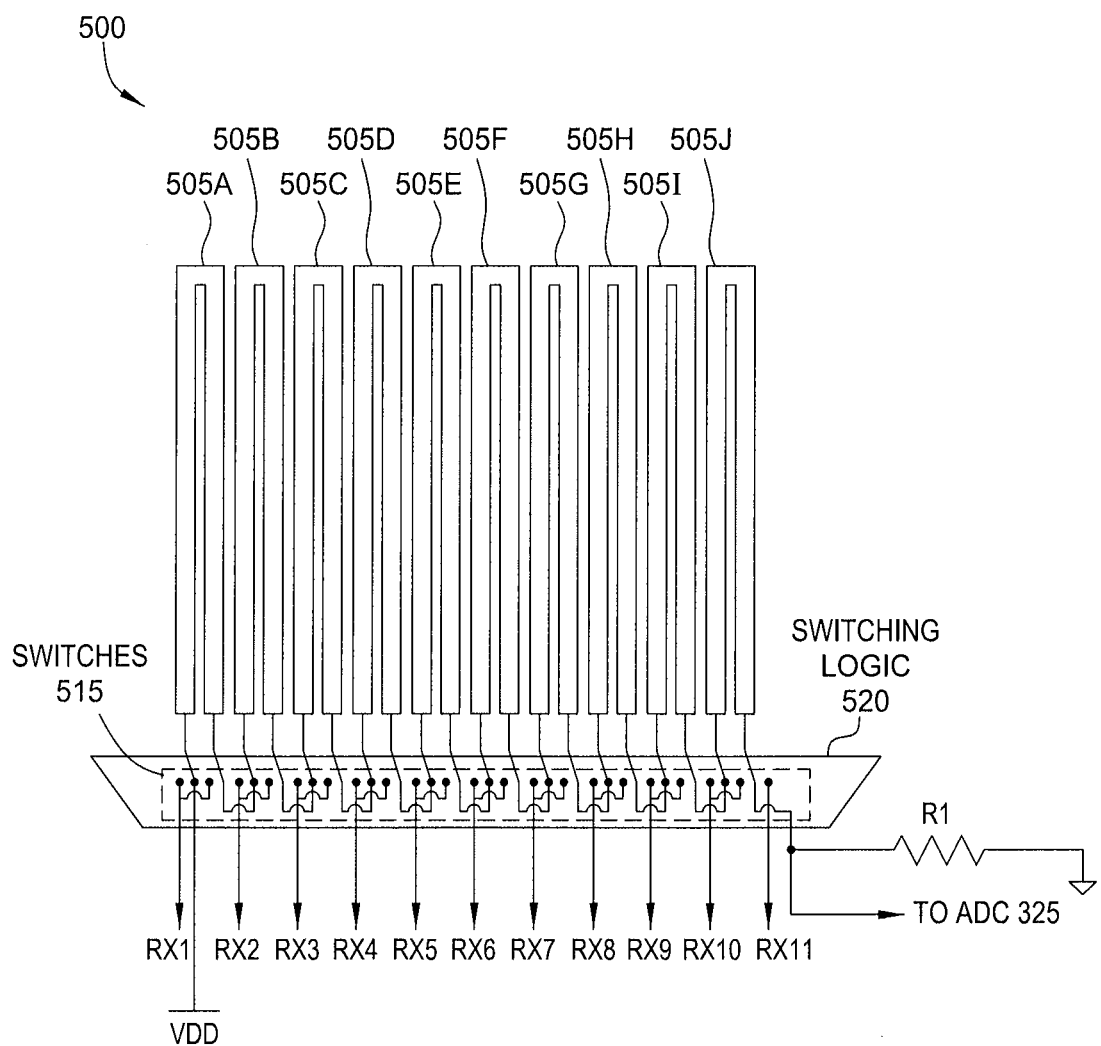
FIG. 5 illustrates coupling together a plurality of capacitive sensor electrodes to form a force sensor electrode, according to embodiments described herein.

FIG. 5 illustrates coupling together a plurality of capacitive sensor electrodes 505 to form a hybrid sensor electrode. The arrangement 500 illustrates receiver electrodes 505 where each electrode 505 forms a U-shaped pattern. Although not shown, the input device may include transmitter electrodes disposed on a different layer in the input device. In one embodiment, the input device may use both the transmitter and receiver electrodes to perform transcapacitive sensing and force sensing.

Here, the receiver electrodes 505 are coupled to switching logic 510 which includes a plurality of switches 515. The state of the switches 515 determines if the receiver electrodes 505 are used to perform capacitive sensing or force sensing. In FIG. 5, the switches 515 are configured in a state so that the receiver electrodes 505 perform capacitive sensing. Specifically, the bottom left end of receiver electrode 505A is coupled to VDD while the bottom right end receiver electrode 505A is coupled to the bottom left end of receiver electrode 505B. In turn, the bottom right end of electrode 505B is coupled to the bottom left end of electrode 505C. In this manner, each of the ends of the receiver electrodes 505 are interconnected such that during force sensing the receiver electrodes 505 form one long force sensor electrode. The bottom right end of electrode 505J is connected to resistor R1 and VSS thereby generating a voltage gradient across the electrodes 505 between VSS and VDD. As described above, the ADC 325 measures changes in the resistance $R_{ITO}$ of the interconnected receiver electrodes 505 which is correlated to force.

During capacitive sensing, the switches 515 change state so that the receiver electrodes 505 are no longer interconnected. Stated differently, the electrodes 505 are coupled to respective receivers RX1, RX2, etc. In one embodiment, the receivers measures capacitive sensing signals (i.e., resulting signals) on the receiver electrodes 505 generated by driving the modulated sensing on transmitter electrodes. For example, the receiver RX1 is coupled to both ends of receiver electrode 505A, receiver RX2 is coupled to both ends of receiver electrode 505B, and so forth. In this manner, each receiver electrode 505 is coupled to a receiver. Thus, during capacitive sensing, instead of the receiver electrodes 505 being coupled together, the individual electrodes 505 are electrically isolated from each other. In one embodiment, the receivers RX1-11 measure resulting capacitive sensing signals on the receiver electrodes 505 in parallel. Alternatively, the resulting capacitive sensing signals are measured sequentially or one at a time.

In one embodiment, the input device uses the arrangement 500 to perform capacitive and force sensing. For example, during a first time period, the input device uses the switches 515 to couple the electrodes 505 to the individual receiver traces so that capacitive sensing is performed. During a second time period, the input device changes the state of the switches 515 to couple the electrodes 505 together as shown in FIG. 5. The input device may switch the states of the switches 515 in any desired ratio in order to perform force sensing and capacitive sensing. In one embodiment, the input device may perform capacitive sensing and force sensing for unequal amounts of time or for equal amounts of time.

Figures 6A, 6B:
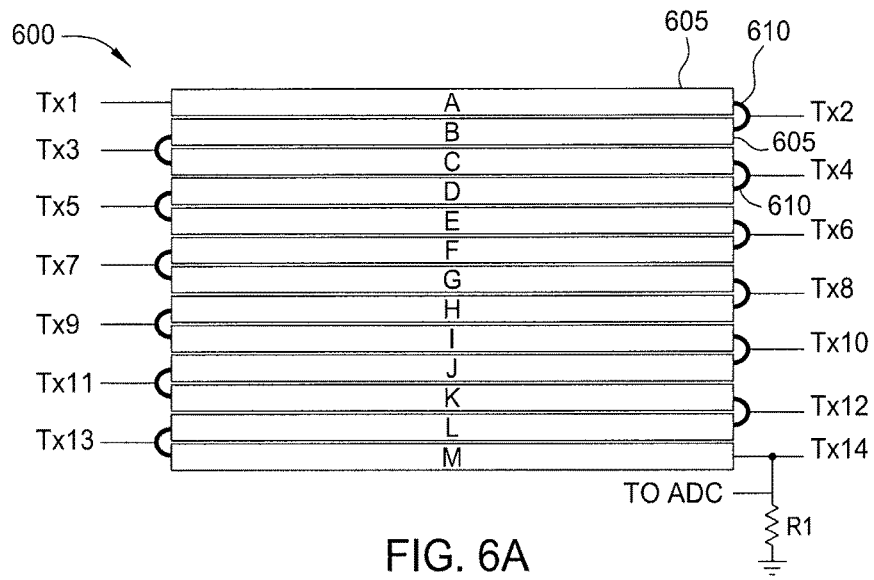
FIG. 6A is a sensor arrangement for using electrodes for both capacitive and force sensing, according to embodiments described herein.
FIG. 6B illustrates charts for decoding capacitive sensing signals using the sensor arrangement in FIG. 6A, according to embodiments described herein.

FIG. 6A is a sensor arrangement 600 for using electrodes 605 for both capacitive and force sensing, according to embodiments described herein. As shown, the Electrode A is coupled at its left end to a transmitter TX1. The right end of Electrode A is coupled to a connector 610 which couples Electrode A to the right end of Electrode B. Moreover, both right ends of Electrodes A and B are coupled to a transmitter TX2. The left end of Electrode B (and the left end of Electrode C) is coupled to another connecter 610 which is also coupled to transmitter TX3.

Using the connectors 610, the arrangement 600 couples the electrodes in a serpentine manner such that a voltage gradient can be generated across the electrodes 605 during force sensing. For example, transmitter TX1 may be driven to VSS while transmitter TX14 is coupled to VDD (via resistor R1). The other transmitters—i.e., transmitters TX2 to TX13—may be electrically floating during force sensing. Thus, the individual electrodes 605 are electrically connected to form a single electrode and form a resistance divider in combination with resistor R1. As described above, changes in the voltage at the node coupled to resistor R1 and the Electrode M can be mapped to forces applied by an input object.

During capacitive sensing, the individual transmitters can be driven (or not driven) to detect a position of one or more input objects. However, because of the connectors 610, driving a modulated signal using one transmitter may result in the modulated signal being transmitted on multiple transmitters. For example, if transmitter TX1 drives the modulated signal (and transmitter TX2 is electrically floating) then signal is driven on both Electrode A and Electrode B (referred to as bleed over) and can be accounted for and removed by the processing system.

FIG. 6B illustrates charts for decoding capacitive sensing signals transmitted using the arrangement 600 in FIG. 6A. In one embodiment, the transmitters TX1-14 are driven sequentially rather than use another driving method such as code division multiplexing (CDM). The left column of chart 650 illustrates driving the modulated signal using a particular transmitter for a particular time period. Because transmitter TX1 is coupled directly to Electrode A, the modulated signal is primarily transmitted on Electrode A (although some of the signal may also be transmitted on Electrode B because of bleed over). A transmitter decoder may measure resulting signals received on receiver electrodes (not shown in arrangement of electrodes 605) in response to driving the modulated signal on Electrode A. The measurement corresponding to driving the signal on Electrode A (i.e., MS_A) is shown in the first row of the left column of chart 655. While transmitter TX1 drives the modulated signal, transmitter TX2 may be grounded (which mitigates bleed over) or be electrically floating.

The second row in chart 650 illustrates driving the modulated signal using transmitter TX2. Because this transmitter is coupled to the right ends of Electrodes A and B, both of these electrodes transmit the modulated signal. To determine a capacitive sensing measurement corresponding to Electrode B, chart 655 illustrates subtracting the measurement taken when driving the modulated signal on both Electrodes A and B using transmitter TX2 (i.e., MS_AB) and subtracting this measurement from the measurement taken when transmitter TX1 drove the signal on Electrode A (i.e., MS_A). The result of this subtraction is the capacitive measurement corresponding to Electrode B (i.e., MS_B).

This process is repeated as the rest of the transmitters (i.e., TX3-14) drive the modulated signal. For example, subtracting the measurement corresponding to Electrode B (MS_B) from the measurement taken when transmitter TX3 drives the modulated signal onto Electrodes B and C (i.e., MS_BC) results in the capacitive sensing measurement for Electrode C (i.e., MS_C). In this manner, the capacitive sensing measurements corresponding to the individual transmitter electrodes (i.e., Electrodes A-M) can be determined. One advantage of the arrangement 600 is that additional switches are not needed when switching between capacitive and force sensing. Instead, the same configuration can be used for both capacitive and force sensing which may reduce the complexity and/or cost of the input device.

In one embodiment, to mitigate bleed over, the steps illustrated in charts 650 and 655 can be repeated where during a first iteration the transmitter opposite the transmitter currently driving the modulated signal is grounded and during a second iteration the transmitter opposite the transmitter currently driving the modulated signal is electrically floating. The resulting capacitive sensing measurements during the two iterations can be averaged to mitigate the effect of bleed over.

Figure 7:
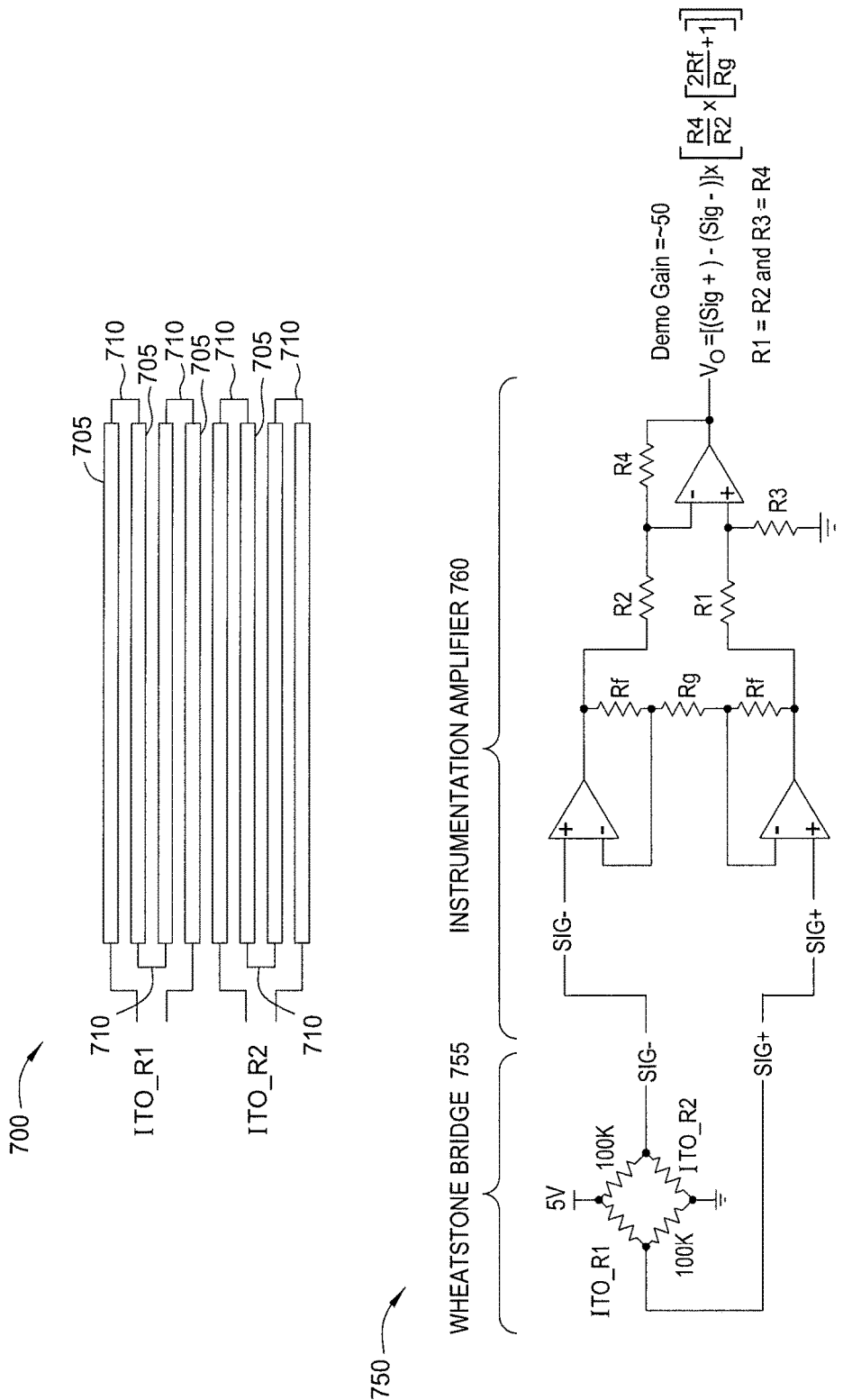
FIG. 7 is a circuit for measuring resistance using at least two force sensor electrodes, according to embodiments described herein.

FIG. 7 is a sensor arrangement 700 for measuring resistance using at least two force sensor electrodes, according to embodiments described herein. As shown, the sensor arrangement 700 includes a plurality of sensor electrodes 705 which be used for capacitive sensing or force sensing. For example, the electrodes 705 may be coupled to transmitters (not shown) either using the arrangement shown in FIG. 4 or 6A (i.e., without switches) or the arrangements shown in FIG. 3 or 5 where switches are used to change between capacitive and force sensing.

For simplicity, FIG. 7 illustrates a time when the electrodes 705 are coupled together to form force sensor electrodes. Specifically, the top half of the electrodes 705 (i.e., the top four electrodes 705) are coupled in a serpentine pattern by connectors 710 to form a first force sensor electrode, while the remaining half of the electrodes 705 are coupled in a serpentine pattern by connector 710 to form a second force sensor electrode. The resistance of the first force sensor electrode is ITO_R1 while the resistance of the second force sensor electrode is ITO_R2. In one embodiment, the two force sensor electrodes (which are formed by interconnecting a plurality of the electrodes 705) may extend across the entire sensing region of the input device.

To measure changes in resistance of the force sensor electrodes, the input device may use circuit 750 which includes a Wheatstone bridge 755 and an instrumentation amplifier 760. The ends of the two force sensor electrodes (represented by the resistors ITO_R1 and ITO_R2) are coupled to the 50 k Ohms and 100 k Ohms resistors in the bridge 755. The bridge 755 outputs two differential signals (labeled Sig− and Sig+) to the instrumentation amplifier 760. Because there are two force sensor electrodes (rather than interconnecting all of the electrodes 705 to form a single force sensor electrode), the amplifier 760 outputs twice as much signal when the two force sensor electrodes are connected on opposite sides of the bridge 755 as shown. Thus, the circuit 750 can provide more accurate force sensing signals than if the arrangement 700 had only one long force sensor electrode coupled to one side of the bridge 755.

Figure 8:
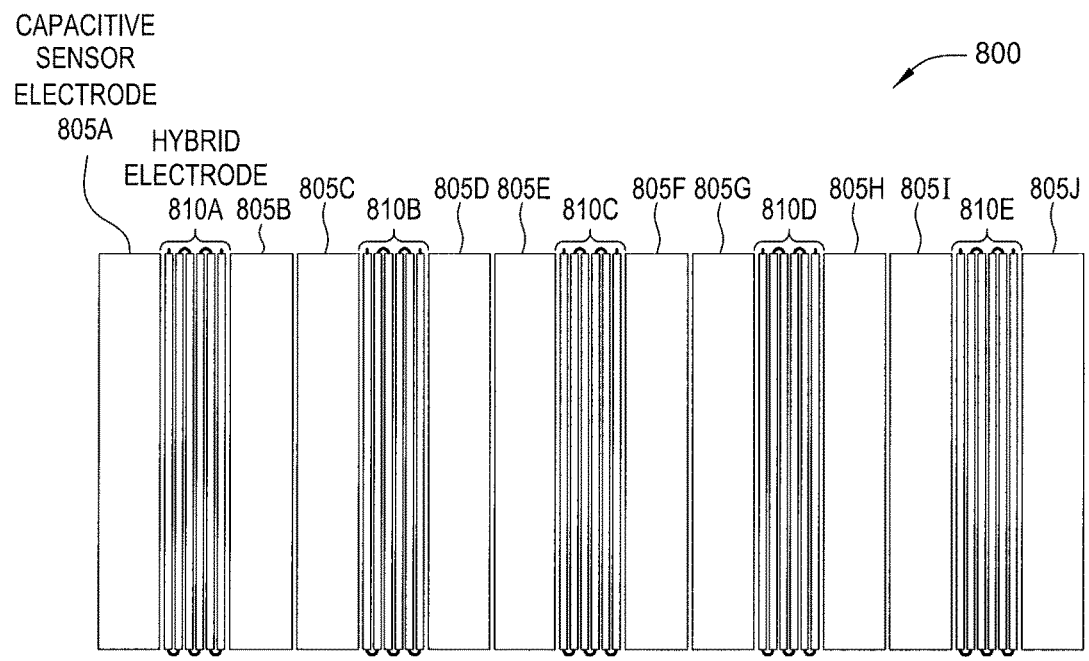
FIG. 8 is a sensor arrangement for measuring different forces at multiple locations simultaneously, according to embodiments described herein.

FIG. 8 is a sensor arrangement 800 for measuring different forces at multiple locations simultaneously, according to embodiments described herein. The arrangement 800 includes capacitive sensor electrodes 805 which are used exclusively for capacitive sensing and hybrid electrodes 810 which can be used for both capacitive sensing and force sensing. For example, during capacitive sensing, the individual vertical electrodes (not labeled) in each hybrid electrode 810 may be driven using the same transmitter such that the individual electrodes, in combination, behave similarly as the capacitive sensor electrodes 805. During force sensing, however, the individual electrodes in each hybrid electrode 810 are interconnected to form the serpentine pattern. That is, the ends of the individual electrodes are interconnected so that the effective length of the hybrid electrode 810 is six times the length of the individual capacitive sensor electrodes 805. A DC voltage can be applied across the ends of the hybrid electrodes 810 to detect changes in resistance which can be correlated to force.

In the arrangement 800, each of the hybrid electrodes 810 are electrically isolated from each other and disposed at different locations within the input device. Although using separate hybrid electrodes 810 rather than one long hybrid electrode that extends throughout the sensing region means the signals measured on the electrodes 810 are smaller, the advantage of using separate hybrid electrodes 810 means force can be detected for multiple input objects (e.g., multiple fingers) simultaneously. That is, the input object can detect the force used by one finger to press down at the location of hybrid electrode 810A and the force used by a second finger that presses down at the location of hybrid electrode 810D. So long as the input objects are not located on the same column—e.g., so long as two fingers do not both press down on any one of the hybrid electrodes 810—the input device can measure a force for each of the input objects.

Figure 9:
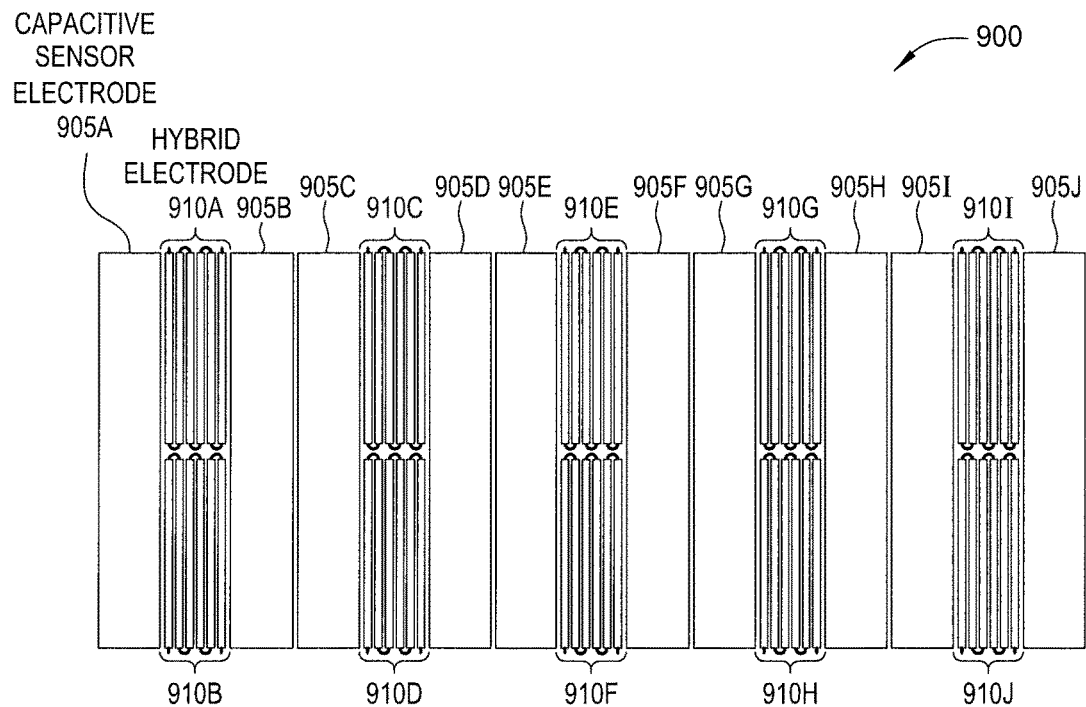
FIG. 9 is a sensor arrangement for measuring different forces at multiple locations simultaneously, according to embodiments described herein.

FIG. 9 is a sensor arrangement 900 for measuring different forces at multiple locations simultaneously, according to embodiments described herein. Arrangement 900 is the same as arrangement 800 except that each of the hybrid electrodes is divided into two separate hybrid electrodes 910 in FIG. 9. That is, instead of hybrid electrode 810A extending from the top to the bottom of the sensing region, in FIG. 9, hybrid electrode 910A extends from the top to the middle of the sensing region, while hybrid electrode 910B extends from the middle to the bottom of the sensing region. As a result, the hybrid electrodes 910 in FIG. 9 have half the length of the hybrid electrodes 810 in FIG. 8.

Dividing the hybrid electrodes 910 means the input device can measure force for two input object on the same column. For example, in FIG. 8, if two input objects where disposed on the same column (e.g., the column defined by hybrid electrode 810A) then the input device measures a single force that is a combination of the individual forces application by the input objects. However, if one finger is disposed over hybrid electrode 910A and another is disposed over hybrid electrode 910B, the input device can measure the individual forces applied by the input objects. Thus, not only can the sensor arrangement 900 permit the input device to simultaneously measure force applied by input objects at different columns, but also different rows within the same columns.

In one embodiment, the hybrid electrodes in any of the embodiments described above can be used to perform thermal detection. As discussed above, forces that bend or stretch the material of the hybrid electrodes change the resistance of the material (e.g., ITO). In addition, the resistance of the hybrid electrodes may change in response to changes in temperature. For example, as temperature of the hybrid electrodes increases, the resistance of the hybrid electrode may also increase. If a finger presses down on a hybrid electrode using the same amount of force, the force measured by the input device will change because the finger changes the temperature, and thus, the resistance of the material of the electrodes. Thus, instead of measuring a continuous force, the force begins to drift because of the temperature change.

As mentioned above, the input device maintains a force baseline that is used to detect changes in resistance. That is, the current resistance of the hybrid electrode is compared to the baseline resistance to determine whether an input object applies a force to the electrode. When a finger first presses down on the sensing region, the force baseline is initially kept constant. However, if the finger remains stationary for a predefined period of time (e.g., more than a second), the input device captures a new baseline which will include the change in resistance caused by the finger increasing the temperature of the material of the hybrid electrode. The force baseline may be updated, e.g., every half a second assuming the finger remains stationary (which can be detected by intermittently performing capacitive sensing using the hybrid electrode). Thus, the baseline is updated every half a second to account for changes in temperature.

However, sudden changes in force (e.g., the force applied by the finger changes) are not absorbed into the baseline. Thus, if the force applied by the finger changes suddenly, these changes can be detected by comparing the current resistance of the electrode to the force baseline (which is updated to include the new resistance caused by change in temperature). In this manner, rapid changes in force caused by an input object can be detected while slow drift caused by temperature is absorbed into the baseline. Once the finger lifts (which can be detected using capacitive sensing), the input device may take a new baseline after the heat introduced or absorbed by the finger no longer affects the temperature of the electrodes.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
   a plurality of sensor electrodes in a sensing region of the input device; and
   a processing system coupled to the plurality of sensor electrodes, the processing system configured to:
   during a first time period, perform capacitive sensing using the plurality of sensor electrodes and a modulated signal; and
   during a second time period, determine force applied by an input object by driving a DC voltage across a subset of the plurality of sensor electrodes, wherein a first end of a first sensor electrode of the subset of sensor electrodes is interconnected with a first end of a second sensor electrode of the subset of the sensor electrodes via a connector to form a force sensor electrode, and a second end of the first sensor electrode is electrically coupled to the processing system.

2. The input device of claim 1, wherein performing capacitive sensing comprises:
   driving the modulated signal on a transmitter electrode of the plurality of sensor electrodes; and
   receiving a resulting signal on a receiver electrode of the plurality of sensor electrodes, wherein at least one of the transmitter electrode and the receiver electrode is included within the subset of sensor electrodes used to determine the force applied by the input object.

3. The input device of claim 1, wherein the subset of sensor electrodes further comprises at least a third sensor electrode of the plurality of sensor electrodes, wherein the first sensor electrode, the second sensor electrode, and the third sensor electrode are used to perform capacitive sensing.

4. The input device of claim 3, wherein, during the second time period, the first end of the first sensor electrode is electrically coupled to the second sensor electrode, and the second sensor electrode is electrically coupled to the third sensor electrode to generate an electrical path with a serpentine pattern, wherein the DC voltage is applied across first and second ends of the electrical path.

5. The input device of claim 3, a total length of the force sensor electrode is a combination of the lengths of the first, second, and third sensor electrodes.

6. The input device of claim 3, wherein at least one end of each of the first, second, and third sensor electrodes are coupled to at least one transmitter, wherein, during the first time period, the transmitter drives the modulated signal onto the first, second, and third sensor electrodes.

7. The input device of claim 3, wherein at least one end of each of the first, second, and third sensor electrodes are coupled to at least one receiver, wherein, during the first time period, the receiver receives resulting signals from the first, second, and third sensor electrodes.

8. The input device of claim 1, wherein the subset of sensor electrodes comprises U-shaped receiver electrodes used to receive resulting signals when performing capacitive sensing.

9. The input device of claim 1, wherein the processing system comprises a plurality of switches configured to electrically reconfigure the subset of the sensor electrodes between the first and second time periods.

10. A processing system, comprising:
    an interface configured to couple to a plurality of sensor electrodes in a sensing region of an input device;
    a sensor module configured to:
    during a first time period, perform capacitive sensing using the plurality of sensor electrodes and a modulated signal; and
    during a second time period, determine force applied by an input object by driving a DC voltage across a subset of the plurality of sensor electrodes, wherein a first end of a first sensor electrode of the subset of sensor electrodes interconnected with a first end of a second sensor electrode of the subset of sensor electrodes via a connector to form a force sensor electrode, the processing system is configured to be electrically coupled to a second end of the first sensor electrode.

11. The processing system of claim 10, wherein performing capacitive sensing comprises:
    driving the modulated signal on a transmitter electrode of the plurality of sensor electrodes; and
    receiving a resulting signal on a receiver electrode of the plurality of sensor electrodes, wherein at least one of the transmitter electrode and the receiver electrode is included within the subset of sensor electrodes used to determine the force applied by the input object.

12. The processing system of claim 10, wherein the subset of sensor electrodes further comprises at least a third sensor electrode of the plurality of sensor electrodes, wherein the first sensor electrode, the second sensor electrode, and the third sensor electrode are used to perform capacitive sensing.

13. The processing system of claim 12, wherein, during the second time period, the first end of the first sensor electrode is electrically coupled to the second sensor electrode, and the second sensor electrode is electrically coupled to the third sensor electrode to generate an electrical path with a serpentine pattern, wherein the DC voltage is applied across first and second ends of the electrical path.

14. The processing system of claim 12, a total length of the force sensor electrode is a combination of the lengths of the first, second, and third sensor electrodes.

15. The processing system of claim 10, further comprising:
    a plurality of switches configured to electrically reconfigure the subset of the sensor electrodes between the first and second time periods.

16. An input device, comprising:
    a plurality of sensor electrodes in a sensing region of the input device; and
    a processing system coupled to the plurality of sensor electrodes, the processing system configured to:

during a first time period, drive a modulated signal on a first sensor electrode of the plurality of sensor electrodes to perform capacitive sensing; and during a second time period, drive a DC voltage across the first sensor electrode and measure a resistance of the first sensor electrode to determine a force applied by an input object on the input device, wherein a first end of the first sensor electrode is coupled to a first end of a second sensor electrode of the plurality of sensor electrodes via a connector and a second end of the first sensor electrode is coupled to the processing system.

17. The input device of claim 16, wherein determining the force comprises:

driving the DC voltage across the second sensor electrode and a third sensor electrode of the plurality of sensor electrodes used to perform capacitive sensing, wherein, during the second time period, the first end of the first sensor electrode is electrically coupled to the first end of the second sensor electrode, and a second end of the second sensor electrode is electrically coupled to a first end of the third sensor electrode to generate an electrical path with a serpentine pattern, wherein the DC voltage is applied across first and second ends of the electrical path.

18. The input device of claim 16, wherein measuring a resistance of the first sensor electrode comprises measuring an inherent resistance of the first sensor electrode.

19. A processing system, comprising:

an interface configured to couple to a plurality of sensor electrodes in a sensing region of an input device; and a sensor module configured to:

during a first time period, drive a modulated signal on a first sensor electrode of the plurality of sensor electrodes to perform capacitive sensing; and during a second time period, drive a DC voltage across the first sensor electrode and measure a resistance of the first sensor electrode to determine a force applied by an input object on the input device, wherein a first end of the first sensor electrode is coupled to a first end of a second sensor electrode of the plurality of sensor electrodes via a connector and a second end of the first sensor electrode is coupled to the processing system.

20. The processing system of claim 19, wherein determining the force comprises:

driving the DC voltage across the second sensor electrode and a third sensor electrode of the plurality of sensor electrodes used to perform capacitive sensing, wherein, during the second time period, the first end of the first sensor electrode is electrically coupled to the first end of the second sensor electrode, and a second end of the second sensor electrode is electrically coupled to a first end of the third sensor electrode to generate an electrical path with a serpentine pattern, wherein the DC voltage is applied across first and second ends of the electrical path.

21. The processing system of claim 20, wherein at least one end of each of the first, second, and third sensor electrodes are coupled to at least one transmitter, wherein, during the first time period, the transmitter drives the modulated signal onto the first, second, and third sensor electrodes to perform capacitive sensing.

* * * * *